THIN-FILM RECTIFYING DEVICE COMPRISING A LAYER OF $CeF_3$ BETWEEN A METAL AND CdS LAYER

Filed March 21, 1967

Germano FASANO
Giorgio SACCHI
Claude PONS
INVENTORS

BY George V. [illegible]
Joseph B. [illegible]

United States Patent Office 3,440,499

Patented Apr. 22, 1969

3,440,499

THIN-FILM RECTIFYING DEVICE COMPRISING A LAYER OF $CeF_3$ BETWEEN A METAL AND CdS LAYER

Germano Fasano, Via Privata Fonzaso 3, Milan, Italy; Giorgio Sacchi, Piazzale Gerbetto 7, Como, Italy; and Claude Pons, Via Giovanni XXIII, Bresso, Milan, Italy Filed Mar. 21, 1967, Ser. No. 624,914
Claims priority, application Italy, Mar. 21, 1966, 15,747/66
Int. Cl. H01l 3/00
U.S. Cl. 317—234 2 Claims

ABSTRACT OF THE DISCLOSURE

A thin-film, vacuum deposited rectifier device comprising a layer of cerium fluoride layer interposed between a metal film and a cadmium sulfide layer.

This invention relates to rectifying diodes obtained by vapor-deposition of thin films, and more precisely to vapor deposited rectifying diodes, comprising an insulating layer interposed between semi-insulating and metal-conduction layers.

The modern techniques of employing semiconducting devices requires the possibility of building whole electronic circuits, named "integrated circuits," by selectively depositing suitable materials over definite areas in form of very thin, conveniently superimposed films.

Said deposition is generally obtained by condensation of vacuum-vaporized materials in presence of suitable masks limiting the areas that are to be covered.

By said techniques passive circuit elements, as resistors and capacitors, are easily obtained, but remarkable difficulties are involved in fabricating rectifying devices and active elements. Rectifying devices on this kind are known, which are obtained by depositing, in succession, on a glass plate, a first metallic layer acting as anode, a layer of semiconducting material, having a large forbidden band, as for instance cadmium sulfide, and a second metallic layer acting as cathode.

Such a device, using Au, CdS, Te is described in the article of J. Dresner and F. V. Shallcross, "Rectification and Spacecharge Limited Current in CdS Films," published by "Solid State Electronics," 1962, vol. 5, pp. 205–210.

The CdS deposited film has a microcrystalline structure, which causes a high density of recombination centers and surface imperfections, particularly near the CdS-metallic anode junction, thus determining unfavorable effects on the efficiency characteristics, the reliability and reproducibility of the device.

Some improvement has been obtained by interposing between the CdS layer and the Au anode a very thin insulating layer, like $Il_2O_3$ or $SiO_2$ or, alternatively, a high resistivity semiconducting material layer as CdTe. Said method is described by R. S. Muller and K. Zuleed in the article, "Vapor Deposited Thin Film Heterojunction Diodes," published by the Journal of Applied Physics, No. 5, May 9, 1961.

However, the aforesaid devices also have shown considerable inconveniences, both for the scarce homogeneity that can be reached in the thin insulating layers, and for the poor rectifying characteristics of the CdS-CdTe heterojunction.

The device object of this invention obviates to such inconveniences, whereby a relatively thin layer of insulating material, for instance cesium fluoride ($CeF_3$) is deposited between the semiconducting material having large forbidden band, as CdS, and the metallic material of the anode, for instance Au, by processes assuring a perfect homogeneity of said insulating layer resulting in a vitreous structure of the same.

The device can be obtained entirely by subsequent depositions of vacuum evaporated materials, and therefore it is fit for fabricating integrated circuits comprising both passive elements and rectifying elements, as, for instance, diode-matrices.

These and other features and advantages of the invention will best be understood from the following description of a preferred embodiment thereof in connection with accompanying drawings in which.

Figure 1:
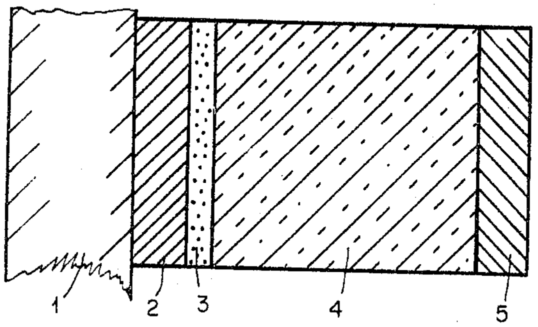
FIG. 1 represents in section a schematic drawing of a diode according to the invention.

Referring to FIG. 1 the diode according to the invention comprises, in superimposed relation, a suitable glass substrate 1, a gold layer 2 about 2,000 A. thick, which acts as anode, a relatively thin insulating layer 3 of cerium fluoride ($CeF_3$) about 200–400 A. thick, a cadmium sulfide (CdS) semiconducting layer 4,500 to 10,000 A. thick, and an aluminium layer, approx. 2,000 A. thick, acting as cathode.

The so constituted diode has the asymmetrical conduction characteristics peculiar of the metal-semiconductor-metal diodes, but the insulating $CeF_3$ layer prevents the interaction between anode recombination centers and surface imperfections of the cadmium sulfide layer, while the same, due to its thinness, does not constitute a substantial obstacle to the flow of the direct current.

Furthermore its vitreous homogeneous structure allows to obtain devices with constant and reproducible characteristics.

The deposition process of said thin layers stands as follows.

Figure 2:
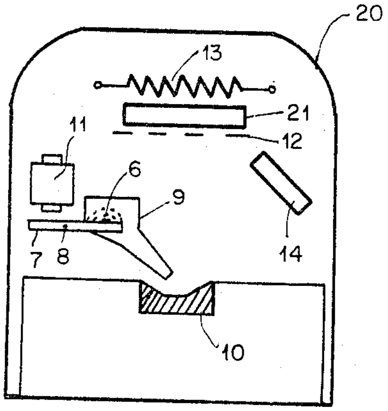
FIG. 2 is schematic drawing of the apparatus for depositing $CeF_3$ layers according to the invention.

On a glass plate substrate, previously carefully prepared, a gold layer about 2,000 A. thin is deposited, by known means, and on this, the $CeF_3$ layer is thereafter deposited using the disposition schematically shown in FIG. 2.

The $CeF_3$, in form of high purity powder, is placed on an oscillating plate 7 pivoted on a pivot .

By energizing the electro-magnet 11 through an external control, plate 7 is subjected to a sharp rocking motion, therefore letting a small determined quantity of powder 6 to fall into the bottom of the tantalum crucible 10, through funel 9.

Said devices are held in an airtight container 20, wherein also the glass plate 21, onto which the evaporated material shall deposit, is placed, about 6 inches apart from the crucible. In the same container, in convenient proximity to the glass plate, the mask 12 delimiting the areas that shall be recovered, and a resistance 13 for heating said plate are diposed.

Near said glass plate 21 a piezoelectric quartz crystal plate is located so that the oscillation frequency of the same is changed in a known manner according to the thickness of the vaporized material condensating onto it.

This device, well known in the art, allows to measure the thickness of the material condensed on the glass plate 21.

The absolute pressure, inside the container, is held to approx. $10^{-5}$ mm. Hg.

By energizing the electro-magnet 11 the plate 7 accomplishes a sharp rocking motion thus causing a dose of $CeF_3$ to fall into the crucible, which is held to a temperature of 1,000° C. by means of an electric current, passing through said crucible.

The $CeF_3$ dose is promptly vaporized and the vapor condenses immediately afterwards on the areas of the glass plate 21 not covered by the mask 12.

The glass plate is held to a temperature of 250° C. by the heating resistance 13 owing to said temperature, the deposited material takes a vitreous perfectly homogeneous structure.

The process is repeated until the requested thickness of deposited material is obtained.

Successively a CdS semiconducting layer is deposited, by a method which allows to overcome the difficulties usually encountered in vaporizing the CdS powder, which are due to the small thermal conductivity of the CdS, and to the poor contacts between said powder and the heat source. In fact, the vaporizing temperature of the CdS is near to its dissociation temperature, and therefore it is important to heat all the material at the requested temperature in a uniform way. This is obtained by the following method.

The chemically pure CdS is furthermore purified by evaporation and recrystallisation in an inert atmosphere of argon.

Figure 3:
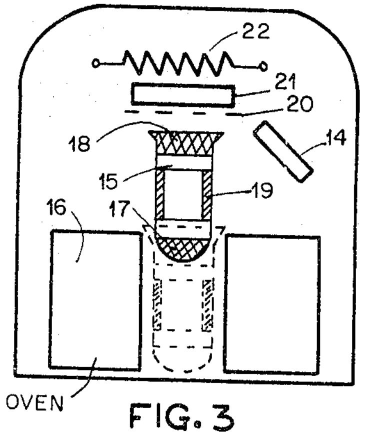
FIG. 3 is a schematic drawing of the apparatus for depositing CdS layer according to the invention.

The purified material 17 is put on the bottom of a cylindrical quartz test-tube 15 placed within an oven in such a way as only the bottom of the tube, containing the CdS, is in the hot zone of the oven at a temperature of about 700° C., corresponding to the sublimation temperature, whereas the tube walls are out of said hot zone at a substantially lower temperature, according to the disposition indicated with a continuous line in FIG. 3.

The mouth of the tube is closed by a quartz wool plug 18.

Under these circumstances the CdS vaporizes and deposits itself in form of a thin layer 19 on the relatively cold walls of the tube. Subsequently the plug 18 is removed and the tube is lowered into the oven assuming the position indicated by the dashed line in FIG. 3. Therefore, the zone of the tube walls on which the thin layer of CdS is deposited reaches rapidly the evaporating temperature. The CdS evaporates in a complete and regular manner, and deposits itself onto the areas of the glass plate 21 not covered by the mask 20.

During this deposition, the glass plate is kept at a temperature of 150° by the heating resistance 22.

Lastly, the aluminium cathode is deposited according to methods known in the art.

The rectifying ratio, that is, the ratio between direct-biased diode current, and the reverse-biased diode current, under a biasing voltage of about 1 v., is $10^5$.

The diode capacitance has a value varying from 30 to 60 pf./cm.$^2$, depending from the thickness of the $CeF_3$ layer, for elements with a surface of about 0.045 mm.$^2$.

Figure 4:
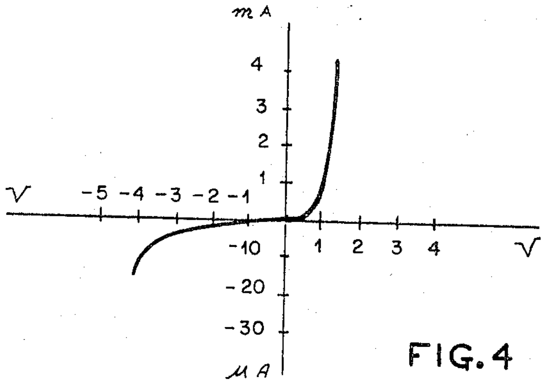
FIG. 4 represents the voltage-current characteristic of a diode according to the invention.

FIG. 4 represents the voltage current characteristic of a diode element according to the invention.

In said figure each division on the abscissa axis corresponds to 1 v. and each division on the positive ordinate axis, corresponding to directly biased currents, is equivalent to 1 ma., whereas on the negative ordinate axis, corresponding to reversely biased currents, each division corresponds to 10 $\mu$A.

Under direct biasing, up to about 0.5 v., the current is practically null, whereas it increases quickly, for applied voltages over said threshold value.

The described process can be applied without substantial modification, using materials different from the indicated substances.

In particular, other rare earth fluorides which, if deposited at convenient temperature, assume a vitreous homogeneous structure may be used in place of the cessium fluoride.

What is claimed is:

1. A thin-film, vacuum deposited electron device comprising, in combination:
   - a supporting substrate
   - a deposited metal film overlying said substrate
   - an electron permeable cerium fluoride layer, overlying said deposited metal film
   - a cadmium sulfide layer, overlying said cerium fluoride layer
   - a deposited metal film overlying said cadmium sulfide film
   - and low resistance contacts to both said metal films.
2. A thin-film, vacuum deposited electron device comprising, in combination:
   - a supporting glass substrate
   - a deposited gold film overlying said glass substrate
   - a cerium fluoride layer having a thickness comprised substantially between 200 and 400 A.
   - a cadmium sulfide layer overlying said cerium fluoride layer
   - a deposited aluminium film overlying said cadmium sulfide layer
   - and low resistance contacts to both said metal films.

UNITED STATES PATENTS

References Cited

| | | | |
|---|---|---|---|
| 3,204,161 | 8/1965 | Witt | 317—235 |
| 3,250,967 | 5/1966 | Rose | 317—234 |
| 3,267,317 | 8/1966 | Fischer | 313—108 |
| 3,319,137 | 5/1967 | Braunstein | 317—234 |
| 3,281,714 | 10/1966 | Haering | 331—94.5 |
| 3,204,159 | 8/1965 | Bramley | 317—235 |

JOHN W. HUCKERT, *Primary Examiner.*

M. EDLOW, *Assistant Examiner.*

U.S. Cl. X.R.

317—235